No. 746,534. PATENTED DEC. 8, 1903.
W. H. LIGHTCAP.
HARVESTER REEL.
APPLICATION FILED FEB. 7, 1903.
NO MODEL.
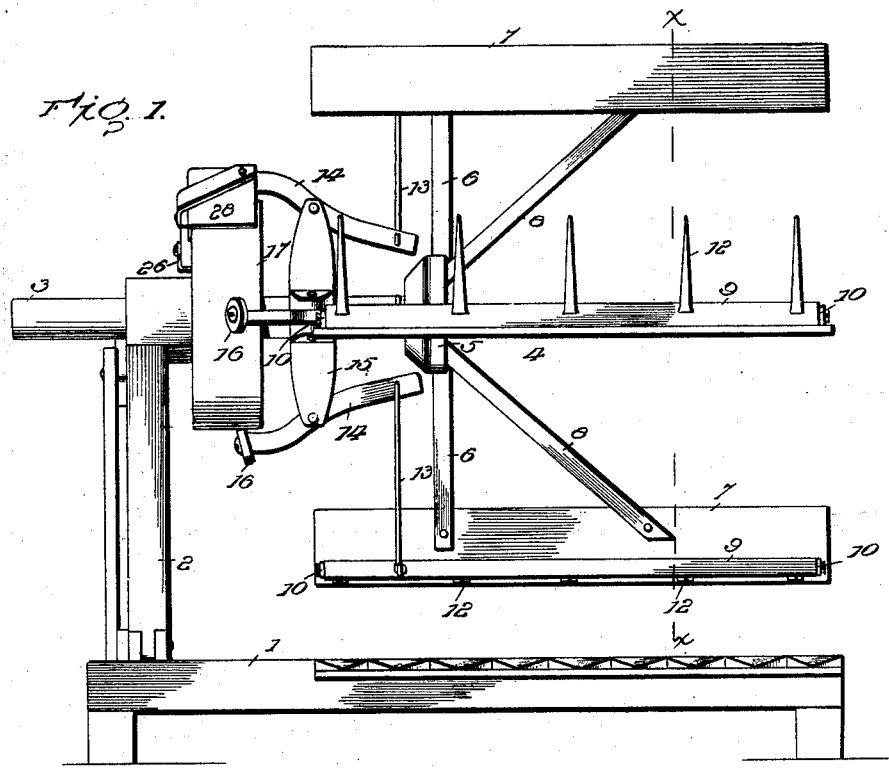
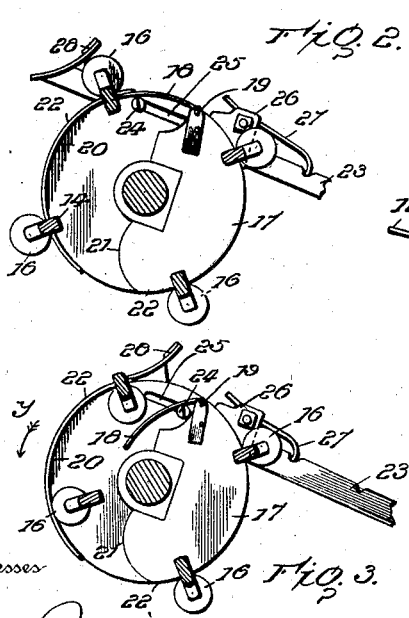
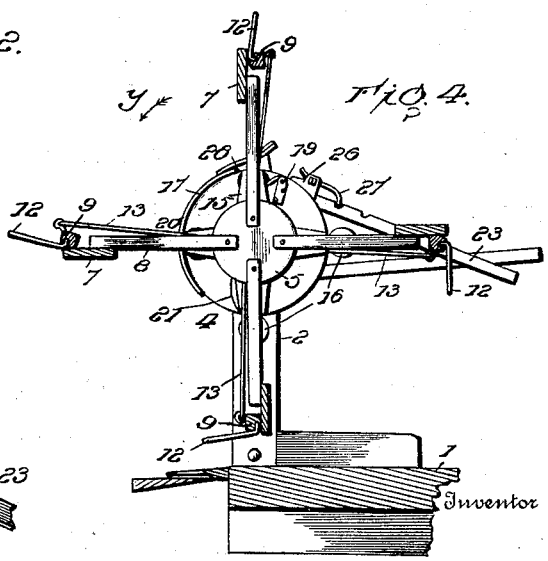
Witnesses
Inventor
William H. Lightcap
By
Attorney No. 746,534.

Patented December 8, 1903.

UNITED STATES PATENT OFFICE.

WILLIAM HENRY LIGHTCAP, OF LANCASTER, WISCONSIN, ASSIGNOR OF ONE-HALF TO WILLIAM T. ANDREWS AND GEORGE F. BEAL, OF MILWAUKEE, WISCONSIN.

HARVESTER-REEL.

SPECIFICATION forming part of Letters Patent No. 746,534, dated December 8, 1903.

Application filed February 7, 1903. Serial No. 142,319. (No model.)

*To all whom it may concern:*

Be it known that I, WILLIAM HENRY LIGHTCAP, of Lancaster, in the county of Grant and State of Wisconsin, have invented certain new and useful Improvements in Harvester-Reels; and I do hereby declare the following to be a full, clear, and exact description of the invention, such as will enable others skilled in the art to which it appertains to make and use the same.

This invention relates to that class of harvester-reels employing means for picking up or straightening fallen grain, such means being capable of being thrown into and out of operation independently of the action of the blades or beaters of the reel.

The object of the invention is to provide an improved pick-up device which may be readily attached to any modern harvester-reel without altering the construction of the latter.

The invention will be hereinafter fully set forth, and particularly pointed out in the claims.

In the accompanying drawings, Figure 1 is a view in front elevation of a reel constructed in accordance with my invention. Figs. 2 and 3 show the stationary cam in different positions. Fig. 4 is a cross-section on line $x\ x$, Fig. 1, showing the position of the pick-up device with relation to the beater.

Referring to the drawings, 1 designates the platform of a harvester having a pivoted upright 2, in which is journaled the reel-shaft 3. The upright 2 may be held in its adjusted position by any preferred means, the object being, as is well known, to permit of regulating the height of the reel with relation to the grain being cut.

The reel 4 is of the type generally employed on grain-binding harvesters, comprising a hub 5 on shaft 3, spokes 6 radiating from the hub, blades or beaters 7, and braces 8, connecting the blades to the hub. Mounted upon one face of each of the blades is a bar 9, journaled at its ends in ears or eyebolts 10, secured to the blade. The bar may be circular in cross-section or merely rounded on that portion of its surface contacting with the blade to permit of its turning freely.

12 designates a series of rake-teeth mounted on and movable with head-bars 9. In order to turn the bars and their teeth, the former are connected by links 13 to levers 14, fulcrumed on a spider 15, mounted on shaft 3, the free ends of the levers carrying rollers 16, which travel entirely around or partly around and partly within a stationary actuating-cam 17, mounted on an angular extension of upright 2. The actuating-cam 17 presents on its practically-uninterrupted exterior a concentric surface, over which the rollers 16 travel when the rakes are not to be actuated. When, however, it is desired to throw the rakes into operation, the operator moves a switch 18 in the form of a segment of the peripheral surface of the cam, being pivoted at 19, so as to direct the rollers inwardly against the inner surface of the curved plate 20. This so draws on the levers that the rakes are thrown into working position. Now as the rollers are about to leave the inner eccentrically-acting surface of plate 20 they engage the eccentric surface 21, by which they are directed against the smooth concentric surface 22, such engagement throwing the rakes out of working position at the time they travel over the cutter-bar. When the rakes are not to be employed, the switch remains locked. The switch is operated by a sliding arm 23, having a pin 24 projecting into a slot 25 in the cam, such pin supporting the switch. The arm 23 is mounted in a bracket 26 on the rear face of the cam and is provided with a suitable catch 27.

28 designates a guard or deflector on the outer free end of arm 23.

When it is desired to employ the rake-teeth to lift or straighten fallen grain, the operator moves arm 23, the switch 18, and deflector 28 to the position shown in Fig. 3. The rotation of the reel in the direction of the arrow $y$ will cause the rollers to travel over the inner surface of plate 20, throwing their respective levers 14 outward, and through links 13 turning bars 9, so that their rake-teeth are about in the planes of the blades on which they are mounted. The teeth will remain in this position while the rollers are moving in contact with plate 20; but upon the rollers contacting with the eccentric surface 21 and while they are moving over the smooth concentric surface 22 the levers 14 are thrown in the opposite direction and bars 9 turned to cause the teeth to pass over the sickle-bar without contacting therewith. This operation will of course continue without requiring the care or attention of the operator as long as the condition of the grain requires it. When the office of the rake-teeth is not desired, arm 23 is moved so as to close the switch, as shown in Fig. 2. The rollers now travel over and around the outer surface of plate 20, which, with the remaining portion of the periphery of the cam, constitutes a uniform concentric surface for the rollers. The levers 14 are in consequence so held that the teeth are at about right angles to the blades and do not interfere with the usual action of the latter when working in straight regular grain, to which the smooth surface of the reel-blade is best adapted.

The advantages of my invention are apparent to those skilled in the art. It will be noted that the bar 9, being mounted immediately upon the blades, simplifies the mechanism for supporting the teeth; also, that the rake-teeth being movable in a plane at right angles to the longitudinal axes of their respective blades may be of sufficient length to effectively lift and straighten the grain with a combing action, yet be readily thrown out of operation to permit the blades to be operated alone—that is, without the raking action. Hence the teeth may be of length greater than the width of the blades. These advantages are obviously not obtainable when the teeth are designed to turn into the beaters, which are made hollow for that purpose, as has heretofore been attempted. In the latter case shorter teeth must be employed, and in moving out of operation a lateral pull is made against the grain. It will be noted, further, that my improvement may be applied to a reel without in any way changing the latter. This is of special importance, as all the advantages of my improvement may be attained in an ordinary reel having solid beaters, such as are now in general use, and the attachment may at any time be removed without in any way affecting the reel itself.

I claim as my invention—

1. The combination with a harvester-reel having longitudinal blades, of bars pivotally mounted immediately on such blades, rake-teeth carried by and movable with said bars, and means for automatically partially rotating the bars for throwing out and retracting the teeth, substantially as set forth.

2. The combination with a harvester-reel having blades, of bars pivotally mounted immediately on such blades and designed to partially rotate thereon, rake-teeth carried by and movable with said bars, and means for automatically partially rotating the bars to turn the teeth approximately into the transverse plane of the blades or at right angles thereto, for the purpose stated.

3. The combination with a harvester-reel, of bars pivotally mounted immediately on the blades of the reel, rake-teeth carried by and movable with such bars, a series of levers connected at one end to said bars, and means for acting on the levers to effect the outward throw and return of the teeth or maintaining them in fixed positions relatively to the blades, as set forth.

4. The combination with a harvester-reel and its shaft, of bars pivotally mounted immediately on the blades of such reel, rake-teeth on said bars, a spider on said shaft, a rigid cam, levers pivoted to said spider, links connecting said bars to said levers, and rollers on said levers designed to engage said cam, substantially as set forth.

5. The combination with a harvester-reel having longitudinal blades, rakes carried by said blades, and levers connected to said rakes, of a cam having an outer concentric surface and an inner eccentric surface, said levers at their inner ends being designed to engage said surfaces, and a switch for directing the inner ends of said levers into engagement with said eccentric surface or to act as a bridge between different portions of such concentric surface, and means for actuating such switch, as set forth.

6. The combination with a harvester-reel having longitudinal blades, rakes carried by said blades, and levers connected to said rakes having rollers on their free ends, of a cam having an outer concentric surface around which the rollers travel, a switch forming a segmental portion of such concentric surface, and means for actuating such switch to direct said rollers against the inner side of a portion of such concentric surface, which acts as a cam on the levers, substantially as set forth.

7. The combination with a harvester-reel having longitudinal blades, rakes carried by said blades, and levers connected to said rakes having rollers on their free ends, of a cam having an outer concentric surface around which the rollers travel, a switch forming a segmental portion of such concentric surface, means for actuating such switch to direct said rollers against the inner side of a portion of such concentric surface, which acts as a cam on the levers, and an eccentric surface with which such rollers engage as they leave the inner side of the said concentric surface, substantially as and for the purpose set forth.

In testimony whereof I have signed this specification in the presence of two subscribing witnesses.

WILLIAM HENRY LIGHTCAP.

Witnesses:
  W. E. SHIMMIN,
  J. M. TEESDALE.